(12) United States Patent
Zhang

(10) Patent No.: US 9,992,560 B2
(45) Date of Patent: Jun. 5, 2018

(54) LIGHT DETECTION MODULE AND LIGHT MODULE

(71) Applicants: Hisense Broadband Multimedia Technologies, Ltd., Tortola (VG); Hisense USA Corp.; Hisense International Co., Ltd., Qingdao, Shandong (CN)

(72) Inventor: Huani Zhang, Shandong (CN)

(73) Assignees: HISENSE BROADBAND MULTIMEDIA TECHNOLOGIES, LTD., Tortola (VG); HISENSE USA COP., Suwanee, GA (US); HISENSE INTERNATIONAL CO., LTD., Qingdao, Shandong (CN)

( * ) Notice: Subject to any disclaimer, the term of this patent is extended or adjusted under 35 U.S.C. 154(b) by 0 days. days.

(21) Appl. No.: 15/085,401

(22) Filed: Mar. 30, 2016

(65) Prior Publication Data

US 2017/0085970 A1  Mar. 23, 2017

(30) Foreign Application Priority Data

Sep. 23, 2015 (CN) .......................... 2015 1 0612621

(51) Int. Cl.
*H04B 10/08* (2006.01)
*H04B 17/00* (2015.01)
(Continued)

(52) U.S. Cl.
CPC .......... *H04Q 11/0005* (2013.01); *H04J 14/02* (2013.01); *H04Q 2011/0011* (2013.01);
(Continued)

(58) Field of Classification Search
CPC . G01J 1/0271; G02B 6/29358; G02B 6/4271; G02B 6/4257; G02B 6/4201; H01S 5/0687; H04B 10/04
(Continued)

(56) References Cited

U.S. PATENT DOCUMENTS 7,093,988 B2 * 8/2006 Tsumori ............... G02B 6/4201
385/92
9,547,138 B2 * 1/2017 Kim ..................... G02B 6/4215
(Continued)

FOREIGN PATENT DOCUMENTS

| CN | 102412240 | 4/2012 |
|---|---|---|
| CN | 105103389 | 11/2015 |
| TW | M505101 | 7/2015 |

OTHER PUBLICATIONS

Office Action for Chinese Application No. 201510612621.X, dated Dec. 19, 2017.

*Primary Examiner* — David Payne
*Assistant Examiner* — Pranesh Barua
(74) *Attorney, Agent, or Firm* — Brinks Gilson & Lione

(57) ABSTRACT

A light detection module includes: a TO base and a TO cap; wherein the TO base is fixedly provided thereon with a first optical sensor, a support frame and a support base; the support frame is fixedly provided thereon with a beam splitter, and the beam splitter and the first optical sensor are at an angle of 45 degrees; an upper surface of the support base is fixedly provided thereon with an optical resonator and a second optical sensor, the optical resonator is located between the beam splitter and the second optical sensor, and the optical resonator, the second optical sensor and the beam splitter are on a straight line parallel to a surface of the TO base; and the TO cap is provided thereon with an opening, and the opening, the first optical sensor and the beam splitter
(Continued)

are on a straight line perpendicular to the surface of the TO base.

18 Claims, 6 Drawing Sheets

(51) Int. Cl.
*H04J 14/00* (2006.01)
*H04B 10/04* (2006.01)
*H04B 10/12* (2006.01)
*G01N 21/00* (2006.01)
*G01B 9/02* (2006.01)
*H04Q 11/00* (2006.01)
*H04J 14/02* (2006.01)

(52) U.S. Cl.
CPC ........... *H04Q 2011/0015* (2013.01); *H04Q 2011/0016* (2013.01)

(58) Field of Classification Search
USPC ................. 356/519, 73; 398/192, 9
See application file for complete search history.

(56) References Cited

U.S. PATENT DOCUMENTS

| | | | | |
|---|---|---|---|---|
| 2002/0015552 A1* | 2/2002 | Link | ........... | G02B 6/29358 385/24 |
| 2002/0093660 A1* | 7/2002 | Maeda | ........... | G01J 9/02 356/450 |
| 2003/0021310 A1* | 1/2003 | Harding | ........... | H01L 23/4093 372/36 |
| 2003/0035119 A1* | 2/2003 | Myatt | ........... | H01S 5/0687 356/519 |
| 2003/0067658 A1* | 4/2003 | Althaus | ........... | G01J 9/00 398/164 |
| 2005/0166011 A1* | 7/2005 | Burnett | ........... | G06F 3/0605 711/112 |
| 2009/0123165 A1* | 5/2009 | Hashimoto | ........... | G02B 6/29358 398/192 |
| 2009/0310635 A1* | 12/2009 | Chen | ........... | H01S 5/0687 372/32 |
| 2010/0150578 A1* | 6/2010 | Fukao | ........... | H04B 10/572 398/192 |
| 2010/0226655 A1* | 9/2010 | Kim | ........... | G02B 6/4246 398/139 |
| 2010/0277726 A1* | 11/2010 | Logan, Jr. | ........... | G01J 3/10 356/326 |
| 2011/0157598 A1* | 6/2011 | Wang | ........... | G01B 11/14 356/487 |
| 2011/0258378 A1* | 10/2011 | Ananthanarayanan | . | G06F 3/061 711/114 |
| 2012/0057864 A1* | 3/2012 | Lim | ........... | G02B 6/4204 398/9 |
| 2012/0268731 A1* | 10/2012 | Zhu | ........... | G01N 21/7746 356/73 |
| 2013/0132371 A1* | 5/2013 | Bharath | ........... | G06F 17/30463 707/719 |
| 2014/0064657 A1* | 3/2014 | Zeng | ........... | G02B 6/4246 385/11 |
| 2014/0285807 A1* | 9/2014 | Mochizuki | ........... | G01J 3/462 356/416 |
| 2014/0293287 A1* | 10/2014 | Hirao | ........... | G01J 3/10 356/450 |
| 2015/0162723 A1* | 6/2015 | Daiber | ........... | H01S 5/141 372/20 |
| 2015/0162990 A1* | 6/2015 | Daiber | ........... | H04B 10/503 398/183 |
| 2016/0056608 A1* | 2/2016 | Kim | ........... | H01S 5/02446 372/20 |
| 2016/0154194 A1* | 6/2016 | Kim | ........... | G02B 6/4215 385/33 |
| 2016/0223393 A1* | 8/2016 | Hsu | ........... | G01J 1/0271 |

* cited by examiner

LIGHT DETECTION MODULE AND LIGHT MODULE

PRIORITY STATEMENT

This application claims priority benefit of Chinese Patent Application No. 201510612621.X filed on Sep. 23, 2015, in the State Intellectual Property Office of the People's Republic of China, the disclosures of which is incorporated herein in its entirety by reference.

TECHNICAL FIELD

The disclosure relates to the field of optical fiber communication technologies, and in particular, to a light detection module and a light module.

BACKGROUND

At present, with development of Dense Wavelength Division Multiplexing (DWDM) technologies, an adjustable laser occupies an important position in smart optical networks as it can provide light waves with greater flexibility and faster supply speed for the operator. However, in actual applications, even when the working condition is unchanged, the wavelength of the light waves generated by the adjustable laser may generally drift 0.03-0.04 nm, and may even offset 1 channel in extreme cases; therefore, if the adjustable laser is intended for large-scale commercial use, it is necessary to use an effective wavelength lock technology to improve wavelength stability of the adjustable laser.

SUMMARY

According to an aspect of the present disclosure, a light detection module may comprise a beam splitter configured to split an incident light beam into a first light beam and a second light beam; a first optical sensor located on a first light path of the first light beam to receive the first light bream; a second optical sensor located on a second light path of the second light beam to receive the second light beam; and an optical resonator in the second light path between the splitter and the second optical sensor.

According to another aspect of the present disclosure, a light detection module may comprise a TO base; a first optical sensor on the TO base; a support frame on the TO base; a support base on the TO base; a beam splitter on the support frame and at an angle of 45 degrees with respect to the first optical sensor; a second optical sensor on an upper surface of the support base; an optical resonator on the upper surface of the support base and between the beam splitter and the second optical sensor, wherein the optical resonator, the second optical sensor and the beam splitter are on a straight line parallel to a surface of the TO base; and a TO cap over the TO base, including an opening thereon, wherein the opening, the first optical sensor and the beam splitter are on a straight line perpendicular to the surface of the TO base.

BRIEF DESCRIPTION OF THE DRAWINGS

To describe the technical solutions of the embodiments of the disclosure or the prior art more clearly, the following briefly introduces the accompanying drawings required for describing the embodiments or the prior art. Apparently, the accompanying drawings in the following description show only some embodiments of the disclosure, and persons of ordinary skill in the art may still derive other drawings from these accompanying drawings without creative efforts.

DETAILED DESCRIPTION

The following clearly and completely describes the technical solutions in the embodiments of the disclosure with reference to the accompanying drawings in the embodiments of the disclosure. The described embodiments are some of the embodiments of the disclosure rather than all of the embodiments. All other embodiments obtained by persons of ordinary skill in the art based on the embodiments of the disclosure without creative efforts shall fall within the protection scope of the disclosure.

In the description of the disclosure, it should be understood that directional or positional relationships indicated by the terms "center", "up", "down", "front", "back", "top", "bottom", "inner", "outer" and so on are directional or positional relationships illustrated based on the drawings, are merely for conveniently describing the disclosure and simplifying the description instead of indicating or implying that the systems or elements must have a specific direction and be constructed and operate in the specific direction, and thus cannot be construed as limitations to the disclosure. In addition, the systems or elements indicated by the terms "first", "second", "another" and so on are systems or elements having a certain function described based on embodiments, are merely for conveniently describing the disclosure and simplifying the description instead of indicating or implying that the systems or elements must be named so, and thus cannot be construed as limitations to the disclosure.

Figure 1:
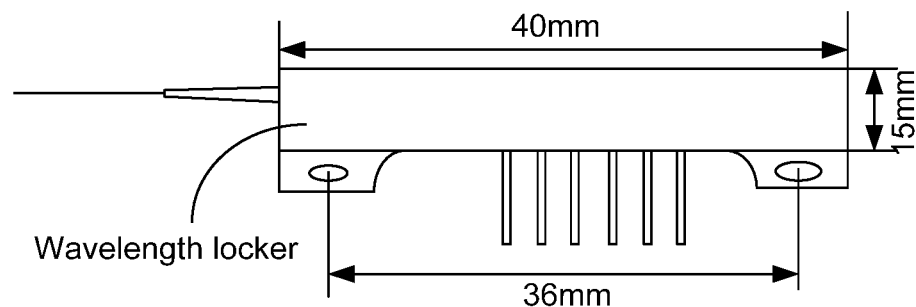
FIG. 1 is a packaged structure view of the existing wavelength locker.

FIG. 1 is a packaged structure view of the existing wavelength locker. The packaged structure includes a package body of 40×36×15 mm and a plurality of pins extending from a bottom surface of the package body. The wavelength locker may be connected to a light module. The light module may input a light beam into the wavelength locker. When wavelength of the light beam changes, the wavelength locker may detect the change and send a feedback signal reflecting the change to the light module.

Figure 2:
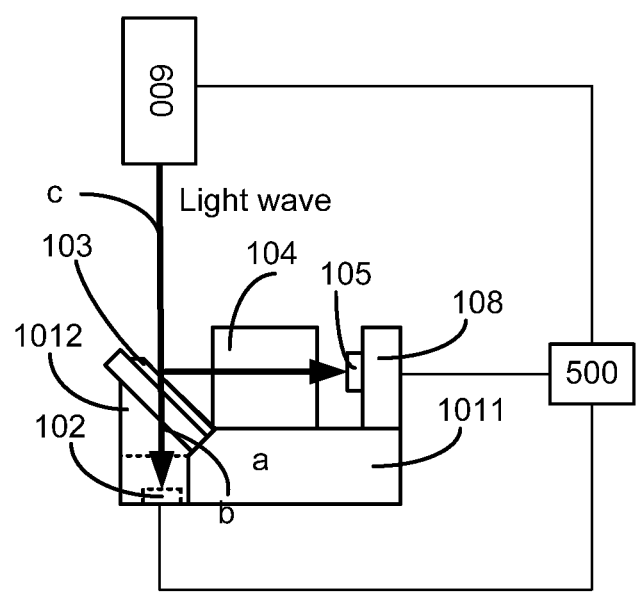
FIG. 2 illustrates a structure of a light detection module according to an embodiment of the present disclosure.

FIG. 2 illustrates a light detection module according to an embodiment of the present disclosure; as shown in FIG. 2, the light detection module may include: a support base 1011, a support frame 1012, a beam splitter 103, a first optical sensor 102, an optical resonator 104 and a second optical sensor 105.

As shown in FIG. 2, the support frame 1012 is located on one side of the support base 1011.

The beam splitter 103 is located on the support frame 1012, and the plane where the beam splitter 103 is located and an upper surface of the support base 1011 are at a preset angle. A light module (i.e., a light generator) may generate and input an incident light c into the beam splitter. The beam splitter 103 may be configured to split the incident light c into two beams, i.e., to reflect part of the incident light (reflected light a) incident to the beam splitter and transmit the remainder of the light (transmission light b). The preset angle may be set based on need and design of the light detection module, which is not limited in the embodiment of the present disclosure.

The support frame 1012 and the beam splitter 103 form a cavity, and the first optical sensor 102 is placed in the cavity, so that the first optical sensor 102 is located below the beam splitter 103, and on a light path of the transmission light b, the first optical sensor 102 receives the transmission light b and monitors light energy of the transmission light b.

The optical resonator 104 and the second optical sensor 105 are located on the upper surface of the support base 1011 and located on a light path of the reflected light a, causing the second optical sensor 105 to receive the reflected light a passing through the optical resonator 104 and detect light energy of the reflected light.

The preset angle may be set depending on need of the module, which is not limited in the embodiment of the present disclosure. In an implementation, it may be set as an angle of 45 degrees. In addition, it should be noted that transmission and reflection proportions of the beam splitter 103 may be set according to insertion loss of the optical resonator 104, and the insertion loss is laser energy lost through the optical resonator 104; for example, as the insertion loss of the optical resonator 104 for the wavelength stipulated by the International Telecommunication Union (ITU-T) is generally 30%, the transmission portion and the reflection portion of the beam splitter 103 may be set as 41% and 59%. This transmission vs. reflection rate ensures that the energy of a light with the ITU-T wavelength reflected to the second optical sensor 105 through the optical resonator 104 is: 59%×70%=41%, which is equal to the 41% light directly transmitted to the first optical sensor 102.

It should be noted that, the optical sensor in the embodiment of the present disclosure may be a monitor photodiode (MPD), and may also a photoresistor or other devices that can monitor light energy.

The optical resonator in the embodiment of the present disclosure may be a Fabry-Perot resonator (F-P resonator), which has wave selecting characteristics, and configured to be a bandpass resonator for light with a particular wavelength (e.g., light with the wavelength stipulated by the ITU-T), i.e., a light with a particular wavelength (e.g., a resonating wavelength) may passes the resonator and light of other wavelengths cannot pass the resonator.

As a laser beam may have multiple wavelengths, which includes light with the particular wavelength of the F-P resonator 104 and light with other wavelengths, when part of the laser beam deviates from the particular wavelength, the deviated laser beam will not be able to pass through the F-P resonator 104, thereby resulting in that light incident onto the second optical sensor 105 decreases and energy weakens, and a current generated by the second optical sensor 105 may also vary accordingly; the first optical sensor 102 is not very sensitive to the wavelengths changing within a certain range (e.g., 1 nm) due to directly receiving the incident light, thus it may be considered that the current detected by the first optical sensor 102 is roughly constant, therefore, in the process of using the light detection module to detect changes of the wavelengths of the light, it is feasible to take the current value detected by the first optical sensor 102 as a reference standard value, and the change of the incident wavelength is judged through comparison between the current detected by the second optical sensor 105 and the current detected by the first optical sensor 102.

Figure 3:
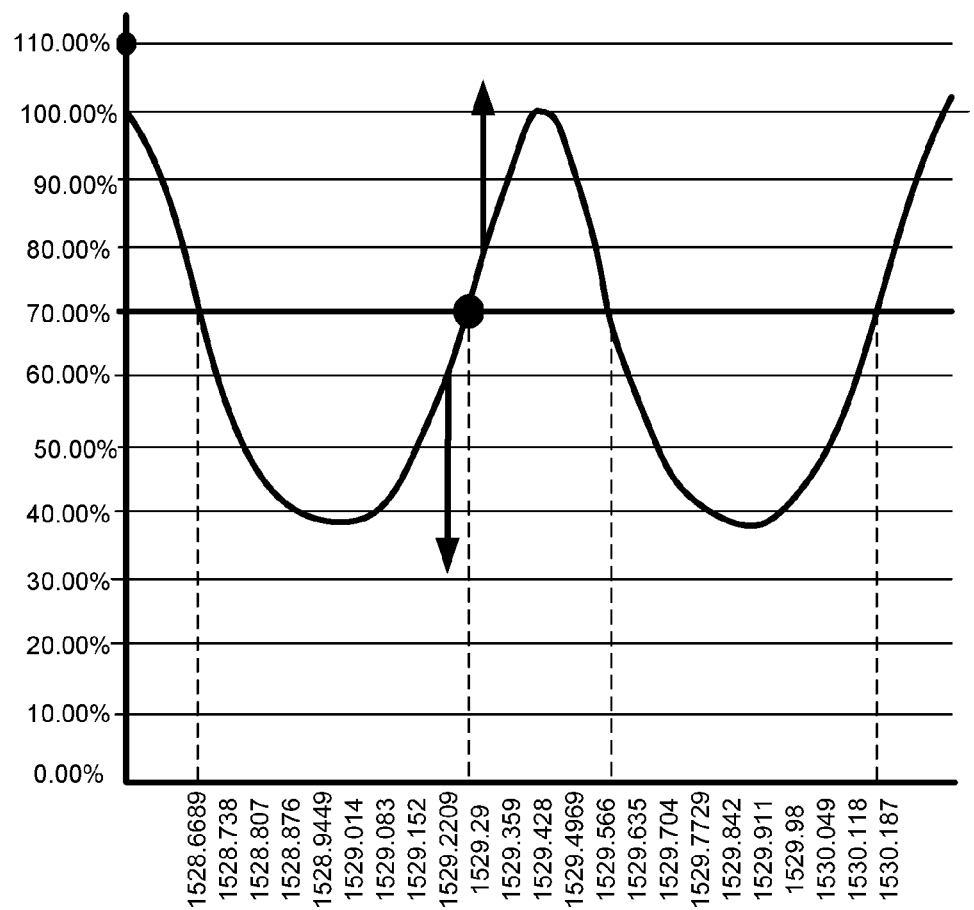
FIG. 3 illustrates a relationship between responsivity and wavelengths of a second optical sensor according to an embodiment of the present disclosure.

For example, as shown in FIG. 3, which shows a relationship curve between responsivity and wavelengths of the second optical sensor; when the wavelength of the light input is on the ITU-T standard, response current signals of the first optical sensor and the second optical sensor are basically the same. When the incident wavelength is greater than the ITU-T standard, responsivity of the second optical sensor is greater than the reference standard value, when the incident wavelength is less than the ITU-T standard, the responsivity of the second optical sensor is less than the reference standard value, and at this point, an automatic wavelength control system may judge a wavelength drifting direction according to the response current of the second optical sensor, to trim the temperature of the adjustable laser within ms to correct the wavelength to the ITU-T standard. For example, suppose the ITU-I wavelength generated by the adjustable laser is 1529.29 nm, at this point, if the responsivity of the second optical sensor detected is 60%, it may be determined according to FIG. 3 that the light generated by the adjustable laser drifts downwards.

The current detected by the first optical sensor 102 and the current detected by the second optical sensor 105 may be send to a modulator 500 to determine the wavelength change of the incident light c. The modulator 500 may determine the wavelength of the incident light c based on difference of the two currents and then send an instruction to the light module 600 to adjust the wavelength of the incident light c. Alternatively, the currents from the first optical sensor 102 and the second optical sensor 105 may be directly feedback to the light module 600. The light module 600 may utilize the two currents as guidance to adjust the wavelength of the incident light c. The wavelength adjustment may be controlled to just offset the change and/or drift of the wavelength.

In the light detection module shown in FIG. 2, the devices used for detecting light changes are vertically packaged around a support base and a support frame located on one side of the support base, the structure is relatively compact, the length dimension of the whole light detection module is reduced, and therefore, the light detection module according to the embodiment of the present disclosure has a small contour dimension, strong universality and is easier to be installed to the light module.

Figure 4:
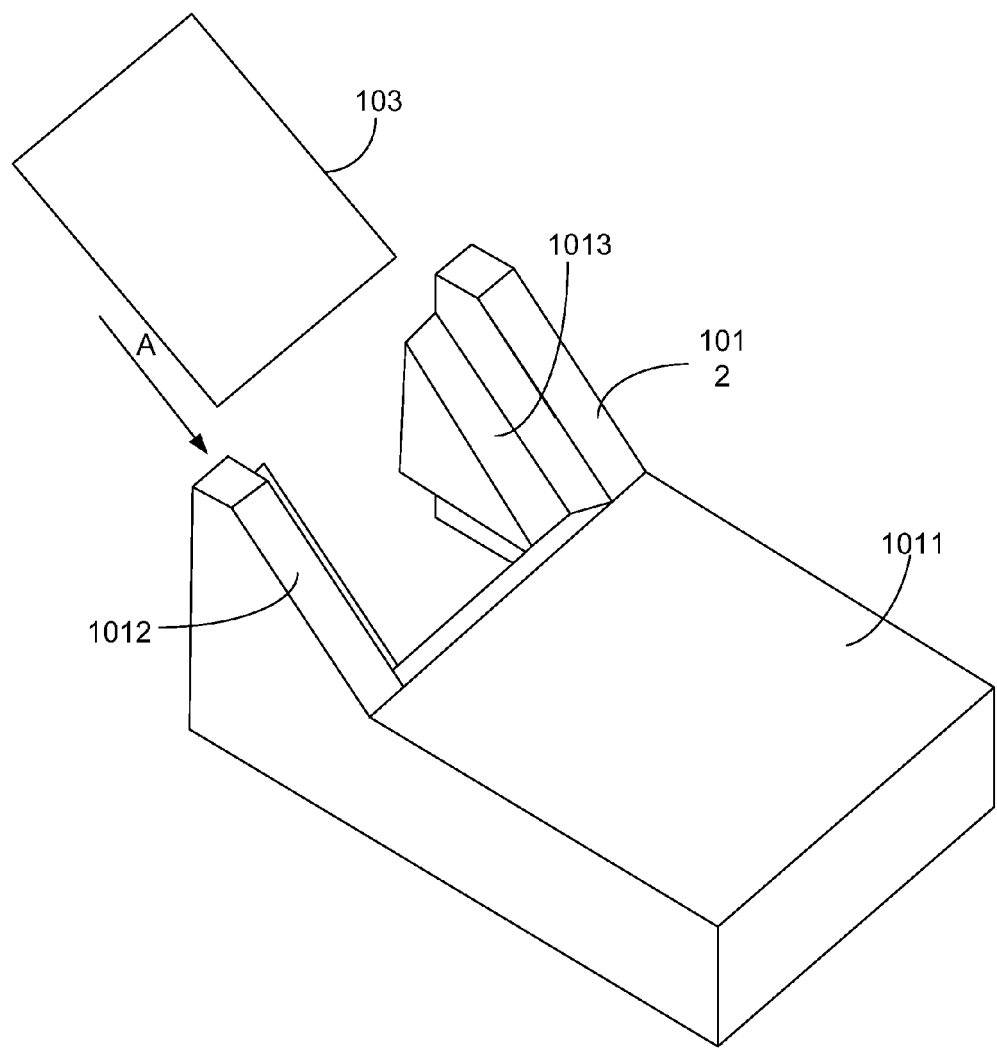
FIG. 4 illustrates a structure of a support base and a support frame according to an embodiment of the present disclosure.

In actual applications, the normal operation of the optical resonator 104 may have higher requirements for environmental temperature. For example, the optical resonator 104 may require its temperature be maintained at about 25 degrees centigrade, therefore, in order to ensure the normal operation of the optical resonator 104, the light detection module further needs to be provided with a device used for reducing heat generated by the optical resonator 104, for example, the support base 1011 and the support frame 1012 in FIG. 2 may be designed as a tungsten copper radiator support as shown in FIG. 4; the tungsten copper radiator support may be metal or surface-metallized ceramic, have a thermal conductivity greater than 170 W/mk and a coefficient of thermal expansion less than $8*10\text{-}6°$ C., and may be used for transmitting heat generated by the optical resonator 104 located thereon.

The support frame 1012 is further provided thereon with a clipping component 1013, and the beam splitter 103 may be obliquely located on the support frame 1012 through the clipping component 1013. For example, as shown in FIG. 4, the beam splitter 103 may be placed on the clipping component 1013 of the support frame 1012 along an arrow direction (A direction).

It should be noted that the clipping component 1013 may be a component in any form that can fix the beam splitter, for example, it may be a clipping slot, and may also be a limit plate fixedly located on a side face of the baffle. In addition, the tungsten copper radiator support as shown in FIG. 4 may be made as large as possible on the premise of meeting the conventional dimension that is easy to be installed to the light module, and in this way, the cooling efficiency of the optical resonator 104 may be increased.

For example, in order to enable the light passing through the optical resonator to be directly incident onto the second optical sensor, as shown in FIG. 2, the light detection module may further include: an optical sensor substrate 108; the optical sensor substrate 108 is located on the support base 1011; and the second optical sensor 105 is located on a vertical plane of the optical sensor substrate 108, wherein the vertical plane of the optical sensor substrate 108 is a plane where the optical sensor substrate 108 is perpendicular to the support base 1011, and the vertical plane is close to the optical resonator 104.

Figure 5:
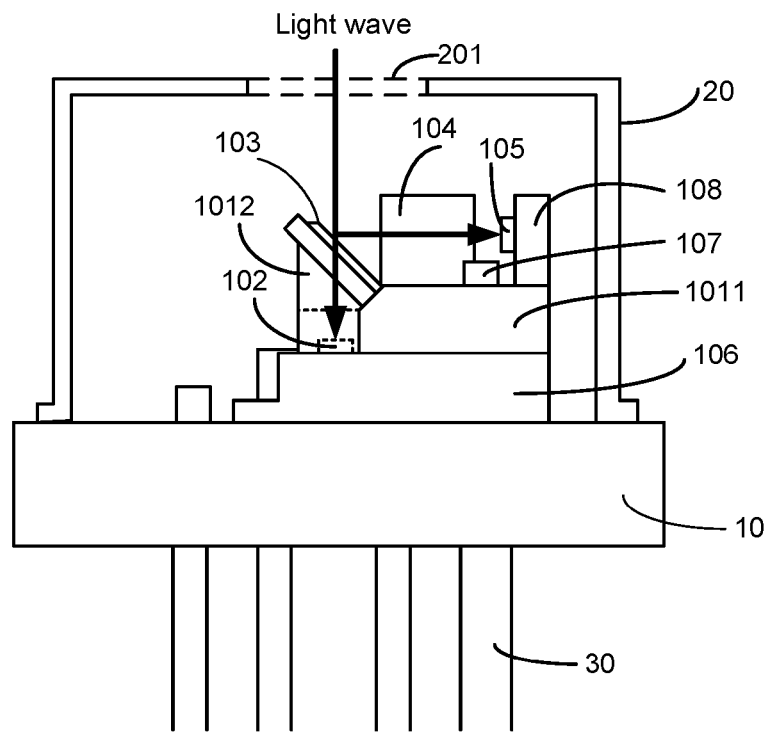
FIG. 5 is a three-dimensional structural view of another light detection module according to an embodiment of the present disclosure.
Figure 6:
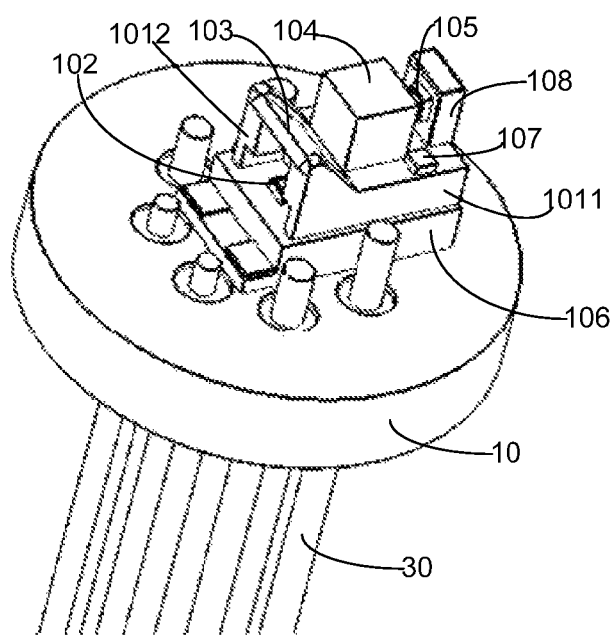
FIG. 6 is a sectional view of another light detection module according to an embodiment of the present disclosure.

Further, in order to fix the devices shown in FIG. 2 and automatically monitor currents on the first optical sensor 102 and the second optical sensor 105, the light detection module may be packaged in the form of Transistor-Outline (TO), as shown in FIG. 5-FIG. 6 (FIG. 5 is a three-dimensional structural view of a light detection module, and FIG. 6 is a sectional view of the light detection module corresponding to FIG. 5), the light detection module may further include: a TO base 10 serving as a substrate, and a pin 30 located on the TO base 10; wherein the support base 1011 and the first optical sensor 102 are located on the TO base 10. The devices shown in FIG. 2 are located on the TO base 10.

Figure 7:
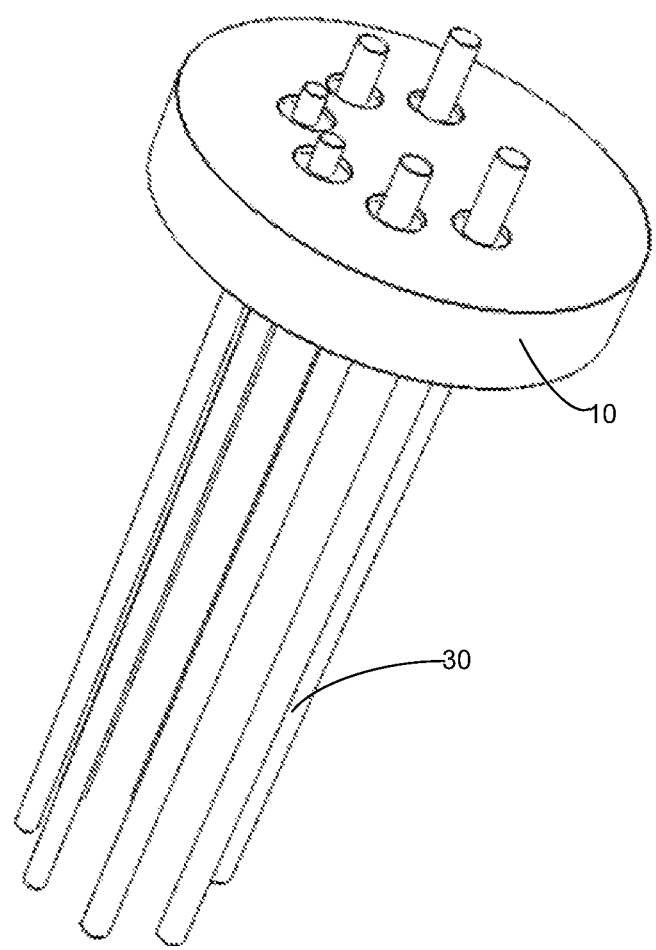
FIG. 7 illustrates a structure of a TO base according to an embodiment of the present disclosure.

For example, FIG. 7 is a structural view of the TO base 10 according to an embodiment of the present disclosure; as shown in FIG. 7, the TO base 10 is provided thereon with multiple pins 30; in actual applications, the first optical sensor, the second optical sensor and the optical resonator may be respectively connected one end of a pin 30, and the other end of each of the multiple pins 30 may be connected with an external acquisition circuit, to facilitate people to monitor working conditions of various devices in the light detection module. It should be noted that, to achieve miniaturization of the light detection module, the diameter of the TO base 10 should be as small as possible, and ni an implementation, it may be 5.5 mm.

Further, to better achieve the control over the temperature of the optical resonator 104, as shown in FIGS. 5-6, the light detection module may further include: a semiconductor cooler (Thermo-electric Cooler, TEC) 106. The first optical sensor 102 and the support base 1011 are located on the TEC 106, and the TEC 106 is located on the TO base 10.

In this way, heat generated by the optical resonator 104 may be first transferred to a cold end of the TEC 106 through the support base 1011, and then the heat is transferred out through the TO base 10 through the Peltier effect of the TEC 106. The Peltier effect refers to a phenomenon that the cold end of the TEC 106 absorbs heat and the hot end releases heat when a direct current passes through the TEC 106.

It should be noted that design of the dimension and performance of the TEC 106 may be set as required; for example, the design of the dimension and performance of the TEC 106 should meet the small size of TO package and can also achieve the optimal cooling effect and the minimum power consumption.

Further, to real-time monitor the change of the temperature of the optical resonator 104 and achieve automatic control over the temperature of the optical resonator 104, as shown in FIG. 3, the light detection module may further include: a temperature controller 107, wherein the temperature controller 107 is located in a position on the upper surface of the support base 101 and close to the optical resonator 104.

The temperature controller 107 may be a thermistor, and a distance between the temperature controller 107 and the optical resonator 104 may be set between 30-200 μm, for example, the distance between the temperature controller 107 and the optical resonator 104 may be set as 50 μm, 60 μm, 80 μm, 100 μm, 120 μm or 140 μm and other values. Exemplarily, in a preferred embodiment of the present disclosure, the distance between the optical resonator 104 and the temperature controller 107 is 100 μm.

In this way, it is feasible to acquire a current temperature value of the optical resonator through the temperature controller 107, according to the change of the temperature value, apply a current to the TEC 106 quickly, and achieve stability or change of the temperature of the TEC 106 through heating or cooling.

Further, to protect various devices in the light detection module, as shown in FIG. 5, the light detection module may further include: a TO cap 20, wherein the TO cap 20 is provided thereon with an opening 201, used for making light generated by the adjustable laser reach the beam splitter 103 in the light detection module through the opening 201.

Figure 8:
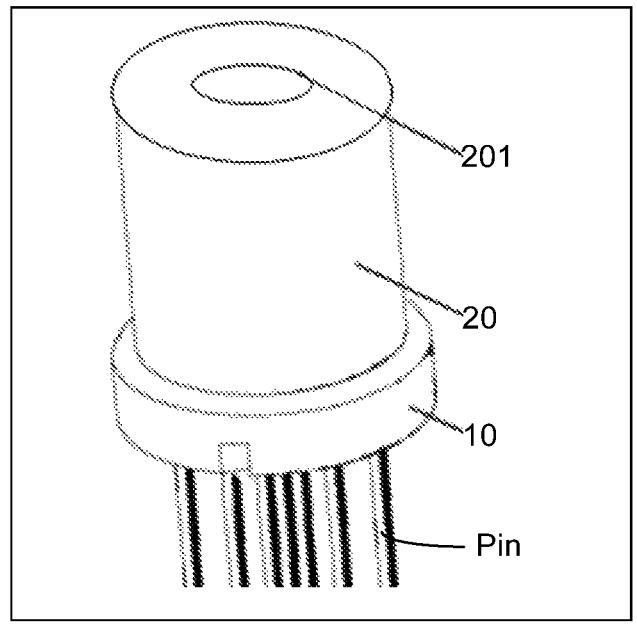
FIG. 8 is an external structural view of another light detection module according to an embodiment of the present disclosure.

The TO cap 20 is sleeved on the TO base 10, and is fixed together with the TO base through welding or adhesion; for example, FIG. 8 is an external structural view of a light detection module, and it may be known from FIG. 8 that the light detection module according to the embodiment of the present disclosure, viewed from the contour, is designed in the form of a TO tube, and the contour is similar to a round shape, so that the light detection module has a smaller size and is easier to be installed to the light module.

Figure 9:
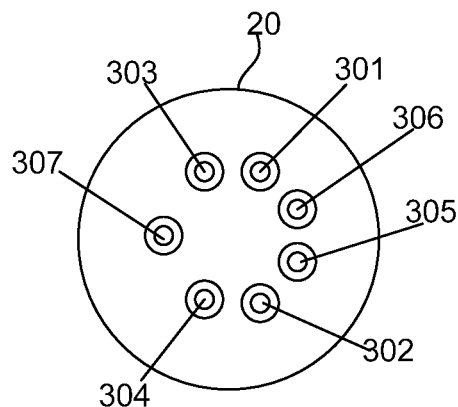
FIG. 9 is a bottom view of another light detection module according to an embodiment of the present disclosure.

Further, to enable various devices in the light detection module shown in FIG. 2-FIG. 3 to work normally, there are at least 7 pins located on the TO base. For example, FIG. 9 is a bottom view of the light detection module shown in FIG. 5-FIG. 6. It may be seen from FIG. 9 that the light detection module may include 7 pins, wherein the pin 301 and the pin 302 are respectively connected with the anode and the cathode of the TEC 106, and the pin 303 is connected with the anode of the second optical sensor 105; the pin 304 is connected with one end of the temperature controller 107; the pin 305 is connected with the anode of the first optical sensor 102; the pin 306 is connected with the cathode of the first optical sensor 102, the cathode of the second optical sensor 105 and the other end of the temperature controller 107; and the pin 307 is a ground (GND) pin.

It should be noted that the arrangement view of the pins shown in FIG. 9 is merely a schematic view, and pins in other arrangement manners also belong to the scope for which protection is sought by the embodiment of the present disclosure, for example, it is also feasible to include at least 8 pins, 7 pins therein may be the same as the meanings represented by the pins shown in FIG. 9, and the rest pin may serve as a reserved pin, for subsequent use.

It may be known from the above that the embodiment of the present disclosure provides a light detection module, the light detection module including: a support base; a support frame; the support frame being located on one side of the support base; a beam splitter; the beam splitter being located on the support frame, and the plane where the beam splitter is located and an upper surface of the support base being at a preset angle, used for reflecting one part of light incident to the beam splitter to form reflected light and transmitting the other part to form transmission light; a first optical sensor; the first optical sensor being located below the beam splitter and located on a light path of the transmission light, causing the first optical sensor to receive the transmission light; and a Fabry-Perot optical resonator and a second optical sensor; the optical resonator and the second optical sensor being located on the upper surface of the support base and located on a light path of the reflected light, causing the second optical sensor to receive the reflected light passing through the optical resonator. In this way, various devices used for detecting light changes are vertically packaged around a support base and a support frame located on one side of the support base, the structure is relatively compact, the length dimension of the whole light detection module is reduced, and therefore, the light detection module according to the embodiment of the present disclosure has a small contour dimension, strong universality and is easier to be installed to the light module.

An embodiment of the present disclosure further provides a light detection module, as shown in FIG. 5, including a TO base 10 and a TO cap 20; wherein the TO base 10 is fixedly provided thereon with a first optical sensor 102, a support frame 1012 and a support base 1011; the support frame 1012 is fixedly provided thereon with a beam splitter 103, and the beam splitter 103 and the first optical sensor 102 are at an angle of 45 degrees; an upper surface of the support base 1011 is fixedly provided thereon with an optical resonator 104 and a second optical sensor 105, the optical resonator 104 is located between the beam splitter 103 and the second optical sensor 105, and the optical resonator 104, the second optical sensor 105 and the beam splitter 103 are on a straight line parallel to a surface of the TO base 10; and the TO cap 20 is provided thereon with an opening 201, and the opening 201, the first optical sensor 102 and the beam splitter 103 are on a straight line perpendicular to the surface of the TO base 10.

For example, as shown in FIG. 5, the light detection module further includes a TEC 106, and the first optical sensor 102, the support frame 1012 and the support base 1011 are all fixed to an upper surface of the TEC 106; and the TEC 106 is fixed onto the TO base 10.

For example, the light detection module further includes a temperature controller 107, wherein the temperature controller 107 is fixedly located on the in a position on the upper surface of the support base 1011 and close to the optical resonator 104.

For example, the light detection module further includes a optical sensor substrate 108, and the second optical sensor 105 is fixed on a vertical plane of the optical sensor substrate 108, wherein the vertical plane of the optical sensor substrate 108 is a plane where the optical sensor substrate 108 is perpendicular to the support base 1011, and the vertical plane of the optical sensor substrate 108 is close to the optical resonator 104.

For example, the light detection module is provided with at least 7 pins.

Figure 10:
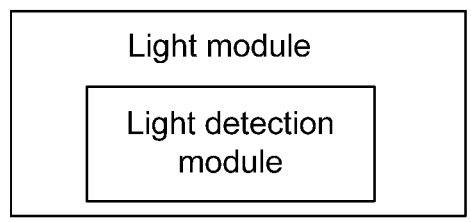
FIG. 10 illustrates a structure of a light module according to an embodiment of the present disclosure.

FIG. 10 illustrates a light module according to an embodiment of the present disclosure; as shown in FIG. 10, the light module may include: a light detection module.

The light detection module may be any one of the above two light detection modules. It may be known from the above that the embodiment of the present disclosure provides a light module, including: a light detection module, in the light detection module, various devices used for detecting light changes are vertically packaged around a support base and a support frame located on one side of the support base, the structure is relatively compact, the length dimension of the whole light detection module is reduced, and therefore, the light detection module according to the embodiment of the present disclosure has a small contour dimension, strong universality and is easier to be installed to the light module.

Finally, it should be noted that the above embodiments are merely used to describe the technical solution of the present disclosure instead of limiting the technical solution; although the present disclosure is described in detail with reference to the foregoing embodiments, persons of ordinary skill in the art should understand that modifications can still be made to the technical solutions described in the foregoing embodiments or some technical features therein are equally replaced; the modifications or replacements do not make the essence of the corresponding technical solutions depart from the spirit and scope of the technical solutions of the embodiments of the present disclosure.

The invention claimed is:

1. A light detection device, comprising:
   a semiconductor thermo-electric cooler (TEC) disposed on a transistor outline (TO) base;
   a first optical sensor disposed on the TEC;
   a support base disposed on the TEC;
   a support frame that extends from the support base;
   a second optical sensor on an upper surface of the support base;
   a beam splitter on the support frame and at an angle of 45 degrees with respect to the first optical sensor, configured to split an incident light beam into a first light beam that travels in a same direction as the incident light beam towards the first optical sensor and a second light beam that travels in a reflected direction of the incident light beam towards the second optical sensor; and
   an optical resonator on the upper surface of the support base and between the beam splitter and the second optical sensor, wherein the optical resonator, the second optical sensor and the beam splitter are on a straight-line parallel to a surface of the TO base.

2. The light detection module according to claim 1, wherein the support frame and the beam splitter form a cavity; and the first optical sensor is located in the cavity.

3. The light detection device according to claim 2, further comprising:
   an optical sensor substrate on the support base; and
   the second optical sensor is located on a vertical plane of the optical sensor substrate;
   wherein the vertical plane of the optical sensor substrate is a plane where the optical sensor substrate is perpendicular to the support base, and the vertical plane is close to the optical resonator.

4. The light detection module according to claim 1, further comprising:
   a pin on the TO base.

5. The light detection device according to claim 1, further comprising a temperature controller on an upper surface of the support base.

6. The light detection device according to claim 4, further comprising a TO cap connected to the TO base and over the beam splitter,
wherein the TO cap includes an opening thereon in a light path of the incident light.

7. The light detection device according to claim 1, wherein
the first optical sensor is a monitor photodiode MPD or a photoresistor;
the second optical sensor is a monitor photodiode MPD or a photoresistor; and
the optical resonator is a Fabry-Perot resonator (F-P resonator).

8. The light detection device according to claim 1, further include a light module to:
generate the incident light and send the incident light to the splitter;
receive an input reflecting a difference between a first current from the first optical sensor and a second current from the second optical sensor; and
adjust wavelength of the incident light according to the input signal.

9. A light detection device, comprising:
a Transistor-Outline (TO) base;
a semiconductor thermo-electric cooler (TEC) disposed on the TO base;
a first optical sensor disposed on the TEC;
a support base disposed on the on the TEC;
a support frame that extends from the support base;
a second optical sensor on an upper surface of the support base;
a beam splitter on the support frame and at an angle of 45 degrees with respect to the first optical sensor, the beam splitter being configured to split an incident light beam into a first light beam that travels in a same direction as the incident light beam towards the first optical sensor and a second light beam that travels in a reflected direction of the incident light beam towards the second optical sensor;
an optical resonator on the upper surface of the support base and between the beam splitter and the second optical sensor, wherein the optical resonator, the second optical sensor and the beam splitter are on a straight line parallel to a surface of the TO base; and
a TO cap over the TO base, including an opening thereon, wherein the opening, the first optical sensor and the beam splitter are on a straight line perpendicular to the surface of the TO base.

10. The light detection device according to claim 9, wherein the first optical sensor, the support frame, and the support base are all fixed to an upper surface of the TEC.

11. The light detection device according to claim 9, further comprising a temperature controller located on the upper surface of the support base and close to the optical resonator.

12. The light detection device according to claim 10, further comprising a temperature controller located on the upper surface of the support base and close to the optical resonator.

13. The light detection device according to claim 9, further comprising an optical sensor substrate on the upper surface of the support base, wherein
the second optical sensor is fixed on a vertical plane of the optical sensor substrate, and
the vertical plane of the optical sensor substrate is a plane where the optical sensor substrate is perpendicular to the support base, and the vertical plane is close to the optical resonator.

14. The light detection device according to claim 10, further comprising an optical sensor substrate on the upper surface of the support base, wherein
the second optical sensor is fixed on a vertical plane of the optical sensor substrate, and
the vertical plane of the optical sensor substrate is a plane where the optical sensor substrate is perpendicular to the support base, and the vertical plane is close to the optical resonator.

15. The light detection device according to claim 12, further comprising an optical sensor substrate on the upper surface of the support base, wherein
the second optical sensor is fixed on a vertical plane of the optical sensor substrate, and
the vertical plane of the optical sensor substrate is a plane where the optical sensor substrate is perpendicular to the support base, and the vertical plane is close to the optical resonator.

16. The light detection device according to claim 9, further comprising an optical sensor substrate on the upper surface of the support base, wherein
the second optical sensor is fixed on a vertical plane of the optical sensor substrate, and
the vertical plane of the optical sensor substrate is a plane where the optical sensor substrate is perpendicular to the support base, and the vertical plane is close to the optical resonator.

17. The light detection device according to claim 9, further comprising at least 7 pins on the TO base.

18. The light detection device according to claim 9, further include a light module to:
generate the incident light and send the incident light to the splitter;
receive an input reflecting a difference between a first current from the first optical sensor and a second current from the second optical sensor; and adjust wavelength of the incident light according to the input signal.

* * * * *